C. C. HAMMOND.
BUTTON SETTING MACHINE.
APPLICATION FILED APR. 21, 1914.

1,144,841.

Patented June 29, 1915.
5 SHEETS—SHEET 1.

C. C. Hammond
Inventor,

Witnesses

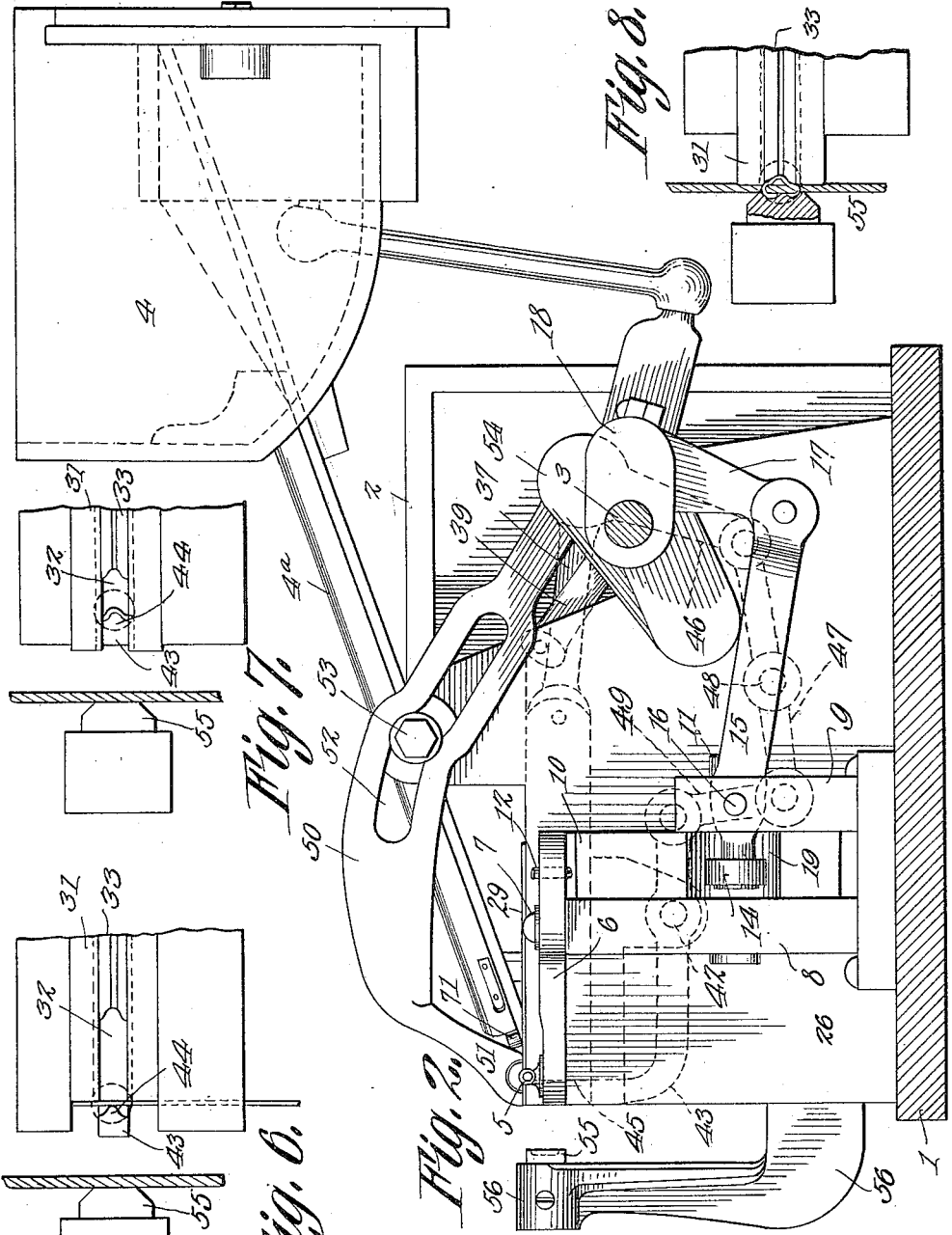

C. C. HAMMOND.
BUTTON SETTING MACHINE.
APPLICATION FILED APR. 21, 1914.
1,144,841.
Patented June 29, 1915.
5 SHEETS—SHEET 3.
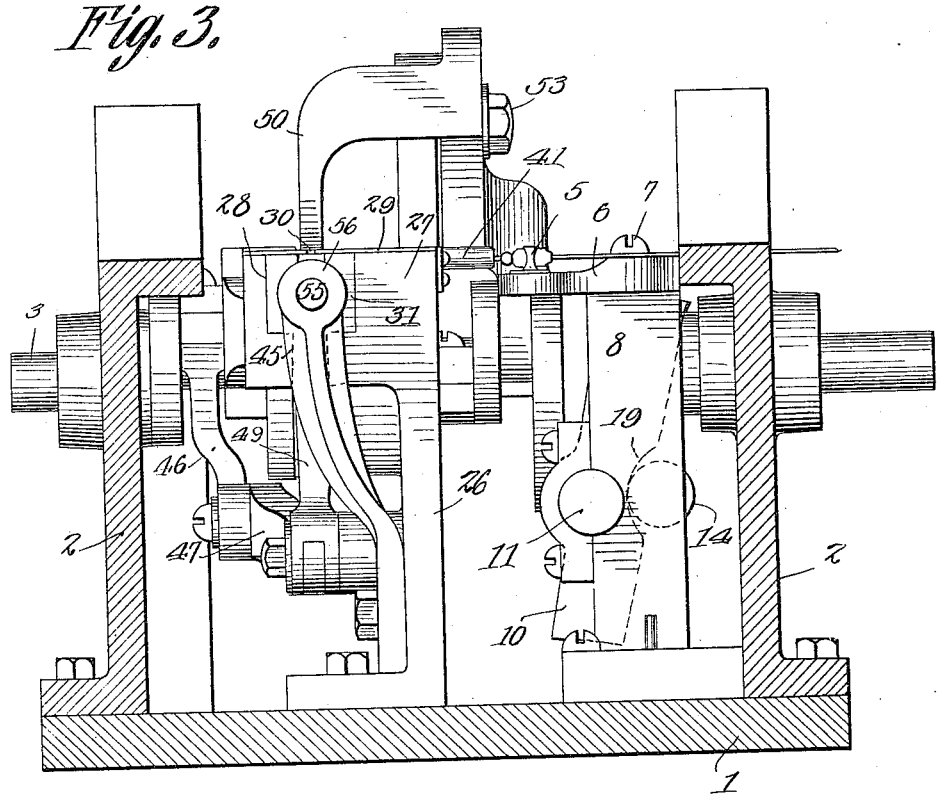
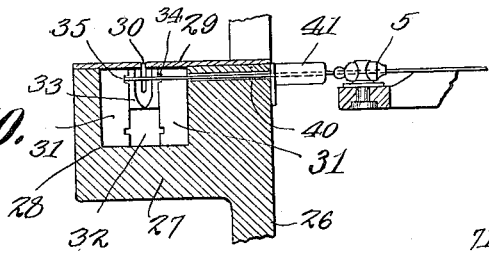
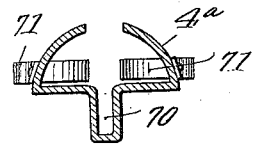
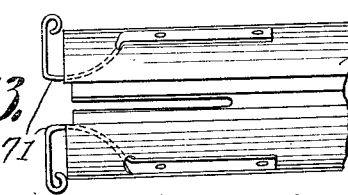
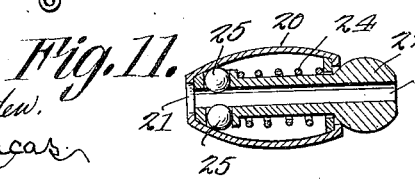
C. C. Hammond
Inventor,
Witnesses

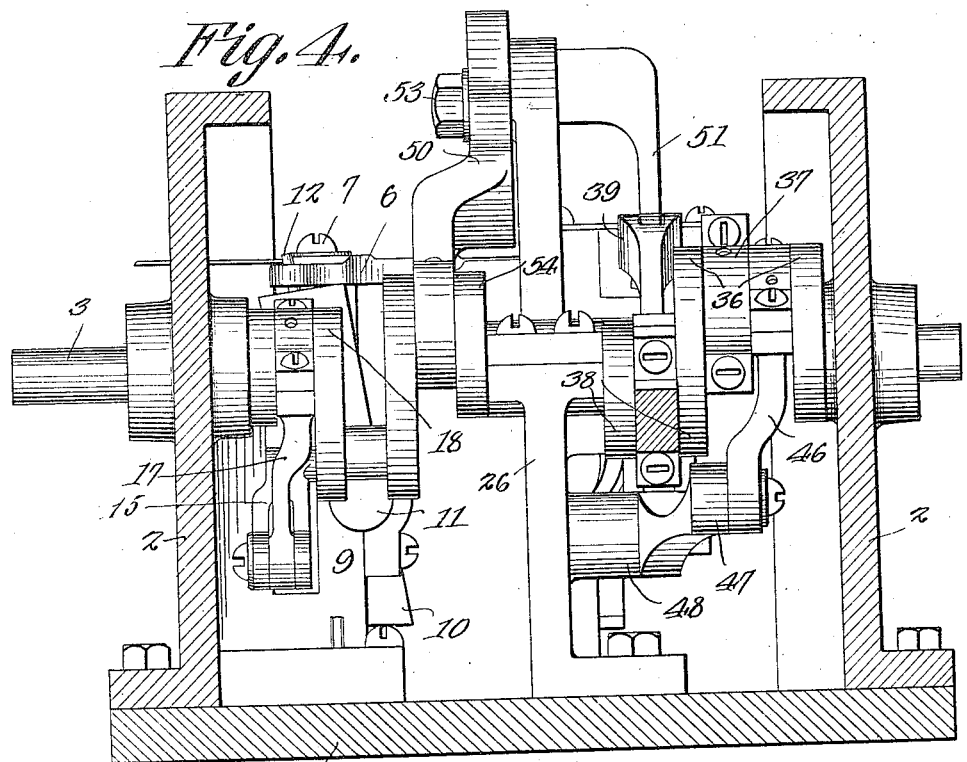
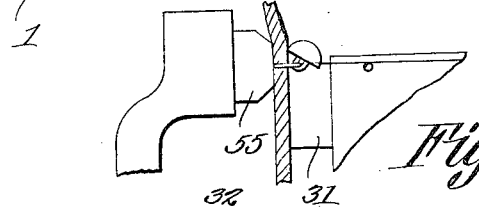
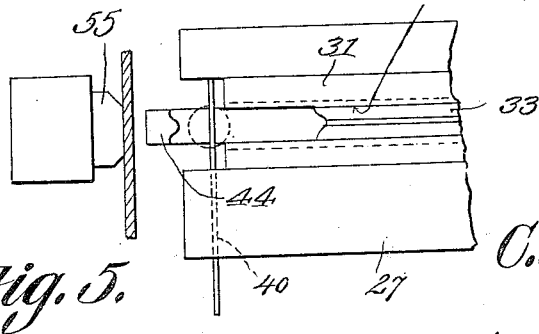

C. C. HAMMOND.
BUTTON SETTING MACHINE.
APPLICATION FILED APR. 21, 1914.

1,144,841.

Patented June 29, 1915.
5 SHEETS—SHEET 5.

C. C. Hammond, Inventor

Witnesses

UNITED STATES PATENT OFFICE.

CLARENCE C. HAMMOND, OF WICHITA, KANSAS.

BUTTON-SETTING MACHINE.

1,144,841.

Specification of Letters Patent. Patented June 29, 1915.

Application filed April 21, 1914. Serial No. 833,383.

*To all whom it may concern:*

Be it known that I, CLARENCE C. HAMMOND, a citizen of the United States, residing at Wichita, in the county of Sedgwick and State of Kansas, have invented certain new and useful Improvements in Button-Setting Machines, of which the following is a specification.

This invention relates to machines for fastening buttons having eye shanks to boots, shoes and other articles, by threading a wire through the shank and forming the same into a staple, the prongs of which are driven through the article to which the buttons are to be fastened, after which the prongs are clenched to complete the fastening.

The invention has for its object to provide a simple and efficient machine of the kind stated, the moving parts of which are so assembled that they may all be driven from one shaft. This object is attained by means of a novel combination and arrangement of parts to be hereinafter described and claimed, reference being had to the accompanying drawings, in which—

Figure 1:
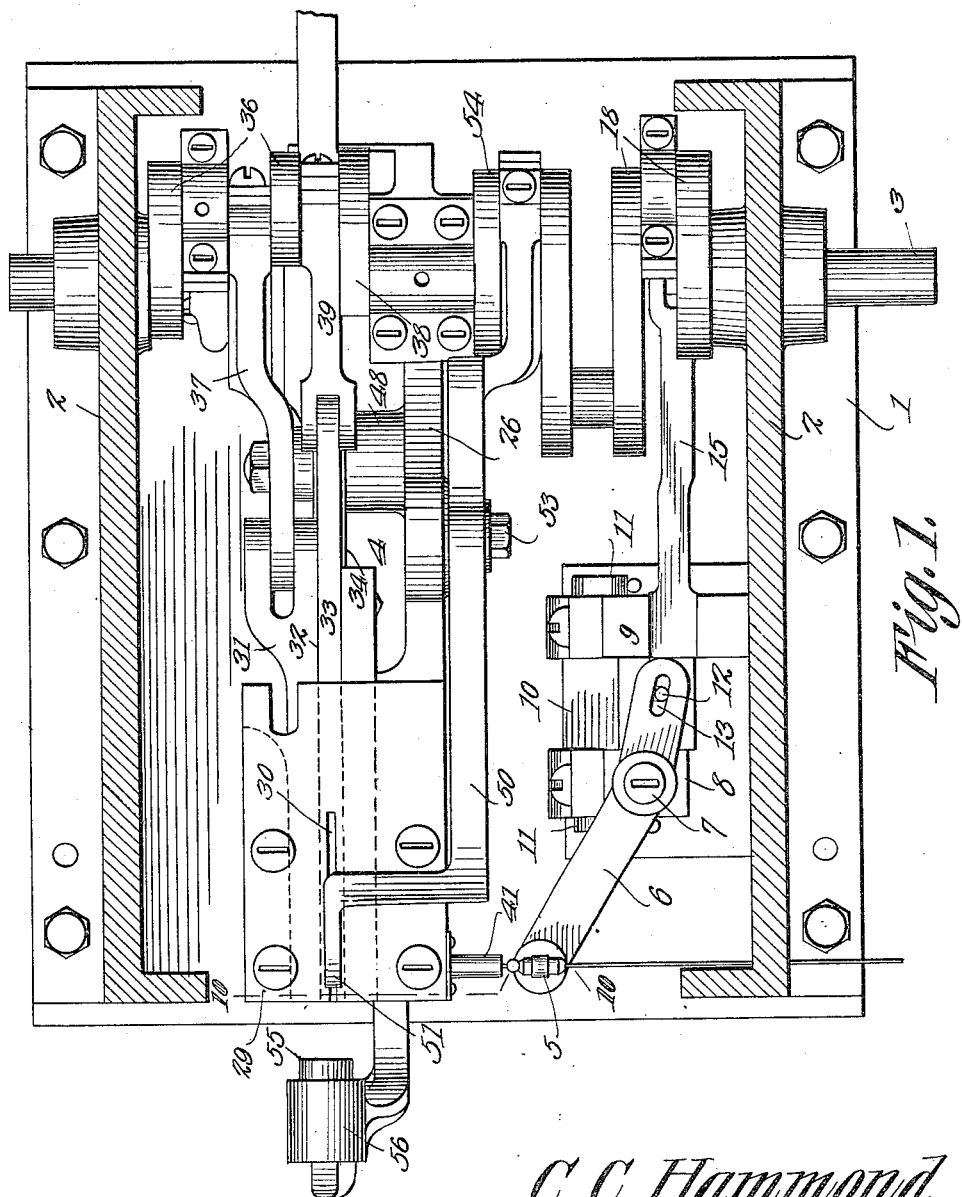
Figure 14:
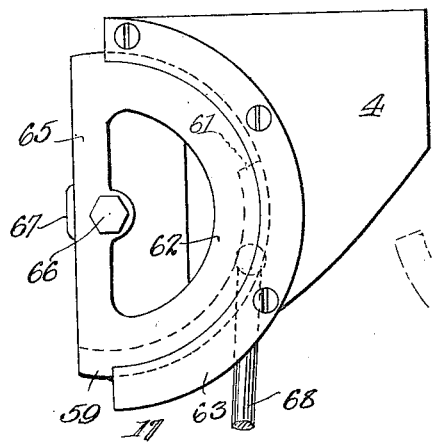
Figure 16:
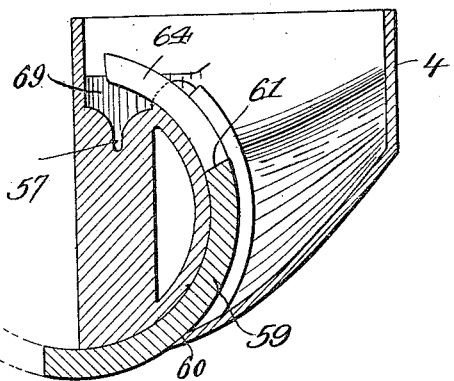
Figures 15, 17:
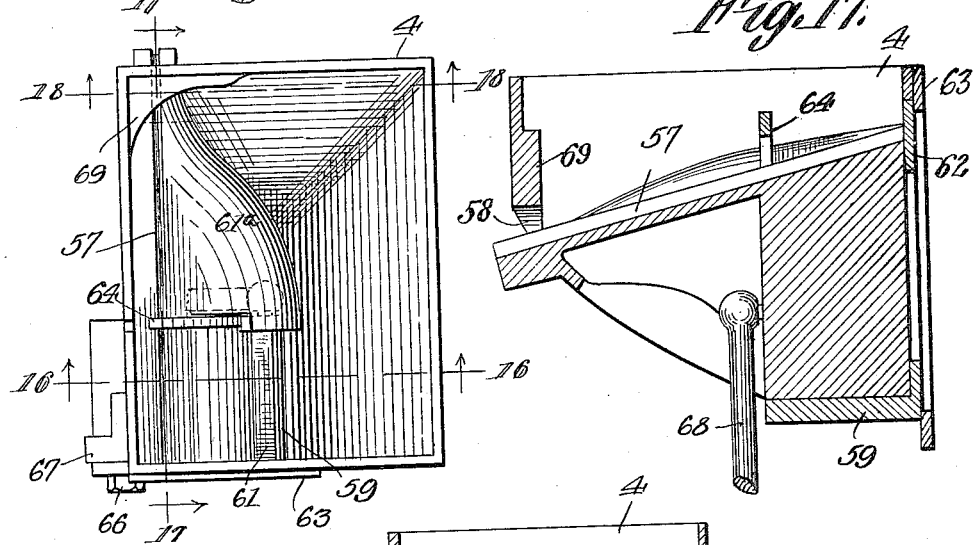
Figure 18:
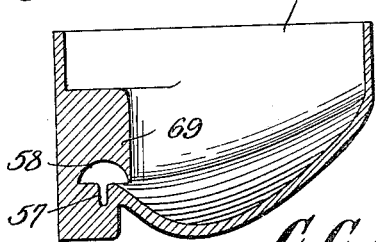

Figure 1 is a plan view of the machine with parts broken away; Fig. 2 is a side elevation thereof; Fig. 3 is a front elevation with parts broken away; Fig. 4 is a rear elevation partly in section; Figs. 5, 6, 7 and 8 are diagrammatic plan views illustrating the operation of the staple forming and setting mechanism; Fig. 9 is a side elevation of the parts shown in Fig. 8; Fig. 10 is a cross-section on the line 10—10 of Fig. 1; Fig. 11 is a longitudinal section of a gripper to be hereinafter described; Fig. 12 is a cross-section of a button chute; Fig. 13 is a plan view of the discharge end or mouth of said chute; Fig. 14 is a side elevation of a button hopper or magazine; Fig. 15 is a plan view thereof, and Figs. 16, 17 and 18 are sections on the lines 16—16, 17—17 and 18—18, respectively, of Fig. 15.

Referring specifically to the drawings, on the base or bed piece 1 of the mechanism, at the ends thereof, are firmly attached upright pieces or standards 2 having bearings in which is journaled a drive shaft 3 having suitable means, to be presently described, whereby motion is imparted to all the moving parts. The shaft is driven from any suitable source of power; or it may be operated by a foot pedal or any other means.

The buttons to be fastened are contained in a hopper or magazine 4 from which they are fed into an inclined chute $4^a$ leading to the staple forming mechanism and carrying the buttons to said mechanism. The staples for fastening the buttons to the article are formed of wire which is passed through the eye-shank of the button, cut off and then bent into a staple, which is driven through the article to which the button is to be secured, and clenched, thus completing the fastening of the button to the article.

The wire-feeding means comprises a gripper 5 carried by a lever 6 fulcrumed at 7 on top of a standard 8 mounted on the base 1. The lever swings in a horizontal plane to carry the gripper toward and from the staple forming mechanism. Opposite the standard 8 is a standard 9, between which standards is mounted, to swing in a vertical plane on an axis at right angles to the axis of the lever 6, a rocker 10, the latter having trunnions 11 intermediate its ends which are supported in bearings on the standards. The upper end of the rocker carries a pin 12 which extends into a slot 13 in the lever 6, whereby the motion of the rocker is transmitted to the lever to operate the gripper 5. The rocker 10 is actuated by a roller 14 carried by a vertically swinging arm 15 pivoted at 16 to the standard 9 and connected by a short pitman 17 to a crank 18 fast on the drive shaft 3. The edge of the rocker 10, directly back of the trunnions or pivots 11, has a depression 19 in which the roller works. It will be evident from the foregoing that the travel of the roller back and forth across the pivotal axis of the rocker 10 will swing the same, which motion is transmitted to the lever 6 by the pin 12.

As shown in Fig. 11, the gripper 5 comprises a tubular casing 20 which tapers toward its forward end and has an opening 21 thereat large enough to allow the wire to pass through. Slidably mounted in the casing and passing out of the rear end thereof is a plunger 22 having a longitudinal bore 23 through which the wire passes. A spring 24 coiled around the plunger and pressing against an abutment thereon tends to force the plunger toward the forward end of the casing. At this end of the casing the plunger has side openings in which seat balls 25 which project into the bore 23 to grip the wire passing through said bore. When the gripper swings forward to feed the wire the plunger is urged toward the contracted end of the casing, and the latter then forces the balls inward, to grip the wire. When the gripper swings back to take a new hold on the wire, the plunger moves back and the balls are allowed to recede from the wire to release the same. The base 1 also carries an intermediate upright piece or standard 26 having a bearing for the shaft 3. The forward end of this standard has a widened portion 27 at the top which is provided with a slot 28 forming a guide for the wire cutting device to be presently described. This slot is covered by a top plate 29 having a slot 30 opening down into the slot 28. In the slot 28 is slidably mounted a wire cutter comprising a longitudinally slidable bar 31 having a longitudinal slot 32 in the upper portion of which is slidably mounted a staple-clenching plunger 33. This plunger has side ribs 34 working in guide grooves 35 in the side walls of the slot 32. The cutter 31 is driven by a crank 36 on the shaft 3 through a pitman connection 37. The plunger 33 is driven by a crank 38 on the shaft 3 through a pitman connection 39. The cutter and plunger are in direct lines with their drive cranks when the latter are at their uppermost travel, thus giving a direct power drive when most needed. The cranks are set ahead or behind each other to properly time the operation of the cutter and the plunger. In the forward end of the standard is a transverse aperture 40 through which the wire is fed into the slot 28 to come in front of the cutter 31 and the plunger 33. The aperture opens into one of the grooves 35. At the outer end of this aperture is a gripper 41 similar to the gripper 5. The gripper 41 serves to hold the wire while the gripper 5 is swinging back to take a new hold on the wire to feed the same forward. To the forward portion of the standard 26, below the part 27, is pivoted, as indicated at 42, a staple former comprising a lever 43 having an upward bend at its forward end terminating in a head 44 around which the wire is adapted to be bent to form the staple. The lever is positioned so that the upward bend may enter the slot 32. The forward end of the part 27 has a recess 45 into which the upward bend of the former lever extends. At the limit of the upward movement of the lever, the head 44 is in front of the cutter 31 and directly in line with the plunger 33, and at the level of the groove 35 and the aperture 40. The lever 43 receives motion from the crank 36 on the shaft 3, said crank being connected by a link 46 to a rocker 47 fulcrumed at 48 on the standard 26 and connected by a link 49 to the rear end of the lever 43. The buttons are taken from the lower end of the chute 4ᵃ by means of an arm 50 having at its forward end an offset and downturned finger 51 which is shaped to fit over a button as shown in Fig. 2. The arm has a slot 52 into which extends a pivot stud 53 carried by the standard 26. The rear end of the arm is connected to a crank 54 on the shaft 3, in view of which the arm derives motion from said shaft. In operation, the finger 51 swings up and down and is also carried back and forth toward and from the lower end of the chute 4ᵃ, this latter movement being due to the slot 52. At the end of its upward movement the finger engages the lowermost button in the chute and it then starts its forward and downward movement, whereby the button is pushed forward with its eye-shank extending down into the slot 30, the latter being in direct line with the chute. The eye-shank is now in line with the aperture 40 and ready to receive the wire. The arm 50 then swings back and places another button in position to receive the wire. In front of the part 26 is a staple clenching anvil 55 carried by a bracket 56 rigidly mounted on the standard 26. The anvil is in line with the slot 28 and faces the parts working therein.

The operation of forming and applying the staple may be summarized as follows: The button being placed as hereinbefore described, and shown in Fig. 2, the wire is fed forward and threaded through the eye-shank as shown in Fig. 5, the cutter 31, the plunger 33 and the staple former 43 being now in retracted position. The staple former then rises and its head 44 comes against one side of the wire. The cutter 31 also advances and engages the other side of the wire, and the latter is firmly held against the head 44, as shown in Fig. 6. The cutter now continues to advance, whereupon the wire is severed and its ends bent around the head 44 to form the two prongs of the staple, as shown in Fig. 7, the prongs being bent over into the grooves 35. The former head 44 also withdraws, thus leaving the staple supported in the grooves 35. The cutter continues to move forward and carries the staple to the material to which the button is to be fastened, said material being placed on the face of the anvil 55. The plunger 33 also continues to advance and upon reaching the staple, it presses the prongs thereof through the material and clenches the same, as shown in Fig. 8, which completes the operation. The parts now return for the next button which has been placed in position by the finger 51. The forward end of the plunger is shaped to fit the staple, and the face of the anvil has a recess for bending the prongs of the staple during the clenching operation after they have been passed through the material. The button magazine 4 above the bottom thereof, contains a button raceway 57 which is inclined toward one end of the magazine, in which latter is an opening 58. The raceway extends for a short distance from this opening and the upper end of the chute 4ᵃ is connected to said projecting end to form a continuation thereof. The raceway has a groove to accommodate the button shank. In the magazine works an oscillatory button elevator designed to elevate the buttons from the bottom of the magazine and to deposit the same into the raceway 57. The elevator is a segmental member 59 which works in a slot 60 in the bottom of the magazine. The concave side of the elevator fits slidably against that portion of the side wall of the magazine which is shaped to form the raceway 57, said portion having an arcuate curve to conform to the curvature of the elevator. The elevator is swung up and down in the magazine to carry its upper end back and forth between the bottom of the magazine and the raceway. The elevator swings transversely of the raceway in a curved path. The buttons are caught on the shoulder 61 formed by the upper end of the elevator, and when said shoulder reaches the raceway at the limit of its upward swing, the buttons drop into the raceway. The elevator then swings back to carry the shoulder to the bottom of the magazine for another supply of buttons. The elevator does not extend throughout the entire length of the magazine, but it is located at the end thereof opposite the end having the outlet opening 58, in view of which the buttons are deposited into the highest part of the raceway, and they slide down the same by gravity. Beyond the elevator, the side wall of the casing slopes downward from the top of the raceway, as indicated at 61ᵃ. The opposite side wall of the magazine, as well as the end wall having the opening 58, slopes toward the elevator, in view of which the buttons tend to settle in that part of the magazine in which the elevator works. The elevator 59 has a flange 62 at one end which works in a recess in the corresponding end of the magazine 4, the joint being covered by a strip 63 secured to the end wall of the magazine, on the outside thereof. At the other end of the elevator a curved flange 64 extends beyond the shoulder 61. The buttons are prevented from dropping off the ends of the shoulder by these flanges. The ends of the flange 62 are connected by a cross-piece 65 having at the center a pivot opening to receive a pivot stud 66 carried by a bracket 67 mounted on the outside of the magazine side wall. To the inner end or edge of the elevator 59 is connected a pitman 68, which is driven from the shaft 3, whereby motion is imparted to the elevator. The bottom of the magazine is suitably recessed to accommodate the pitman. Above the opening 58 is a button knock-off flange 69. Any buttons that are not properly placed in the raceway 57 come in contact with the flange and are deflected from the raceway 57 back into the bottom of the magazine. The button chute 4ᵃ is shaped in cross-section to conform to the shape of the button-head, and said chute has a bottom groove 70 to accommodate the button shank, as shown in Fig. 12. At the mouth or lower end of the chute are located stop springs 71 which extend into the chute and allow the buttons to be intermittently withdrawn by the finger 51 as hereinbefore described.

I claim:

1. In a button-setting machine, staple-forming means, a support for said means having a part provided with a slot, a button chute, a button placing finger movable to carry a button from the chute and to place the same on the support with the shank of the button extending through the slot thereof, a lever carrying said finger, the finger being rigid on the lever, said lever having a slot, a pivot for the lever extending into the slot, a drive shaft, and a crank on said shaft operatively connected to the lever.

2. In a button-setting machine, a staple-forming means, a support for said means having a part provided with a slot, a button chute, a button placing finger movable to carry a button from the chute and to place the same on the support with the shank of the button extending through the slot thereof, a lever carrying said finger, the finger being rigid on the lever, a pivot for the lever, said lever having a slot into which the pivot extends, and said slot extending in a direction to allow the lever to move in the direction of its length, a drive-shaft, and a crank on said drive-shaft operatively connected to the lever for rocking the same on its pivot and for moving the lever in the direction of its length.

3. In a button-setting machine, a drive-shaft, cranks on said shaft, a reciprocatory cutter having a longitudinal slot, a reciprocatory plunger mounted in the slot, means for placing a button in front of the cutter and the plunger, a clenching anvil and a staple-former head in front of the cutter and the plunger, means for feeding wire and threading the same through the button shank, means for advancing and retracting the staple-former head, a pitman connection between the cutter and one of the cranks of the drive-shaft for advancing the cutter to sever the wire and to bend the same into a staple over the staple-former head, and a pitman connection between the plunger and the other crank of the drive-shaft for advancing the plunger to carry the staple against the clenching anvil, the cutter and the plunger being in direct alinement with their drive cranks.

4. In a button-setting machine, a drive-shaft, cranks on said shaft, a reciprocatory cutter having a longitudinal slot, a reciprocatory plunger mounted in the slot of the cutter, means for placing a button in front of the cutter and the plunger, a clenching anvil and a staple-former head in front of the cutter and the plunger, means for feeding wire and threading the same through the button shank, a pitman connection between the cutter and one of the cranks of the drive-shaft for advancing the cutter to sever the wire and to bend the same into a staple over the staple-former head, a pitman connection between the plunger and the other crank of the drive-shaft for advancing the plunger to carry the staple against the clenching anvil, the cutter and the plunger being in direct alinement with their drive cranks, a pivotal support for the staple-former head, a rocker, an operative connection between one end of the rocker and the staple-former head, and an operative connection between the other end of said rocker and one of the aforesaid drive cranks.

In testimony whereof I affix my signature in presence of two witnesses.

CLARENCE C. HAMMOND.

Witnesses:
LEO OLLEN MORGAN,
THEO. A. MORGAN.

Copies of this patent may be obtained for five cents each, by addressing the "Commissioner of Patents, Washington, D. C."